Oct. 5, 1937.　　　F. B. PALMER ET AL　　　2,094,746
AUTOMOBILE DOOR LATCH
Filed March 21, 1935　　　3 Sheets-Sheet 1

INVENTOR
Fred B. Palmer
Carl Cegler
BY
Chappell Earl
ATTORNEYS

Oct. 5, 1937.   F. B. PALMER ET AL   2,094,746
AUTOMOBILE DOOR LATCH
Filed March 21, 1935   3 Sheets-Sheet 2
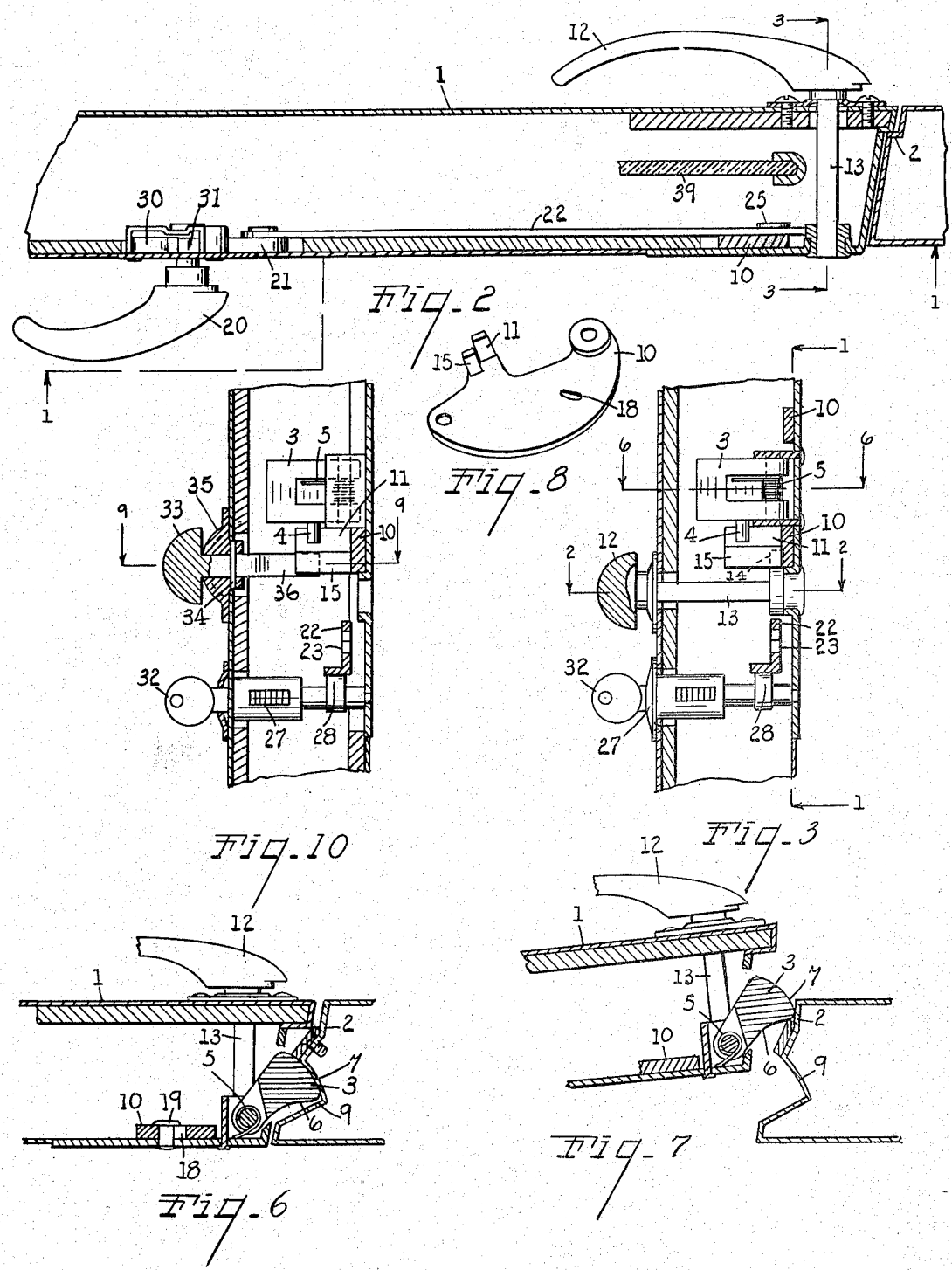
INVENTOR
Fred B. Palmer
Carl Cegler
BY
Chappell Earl
ATTORNEYS

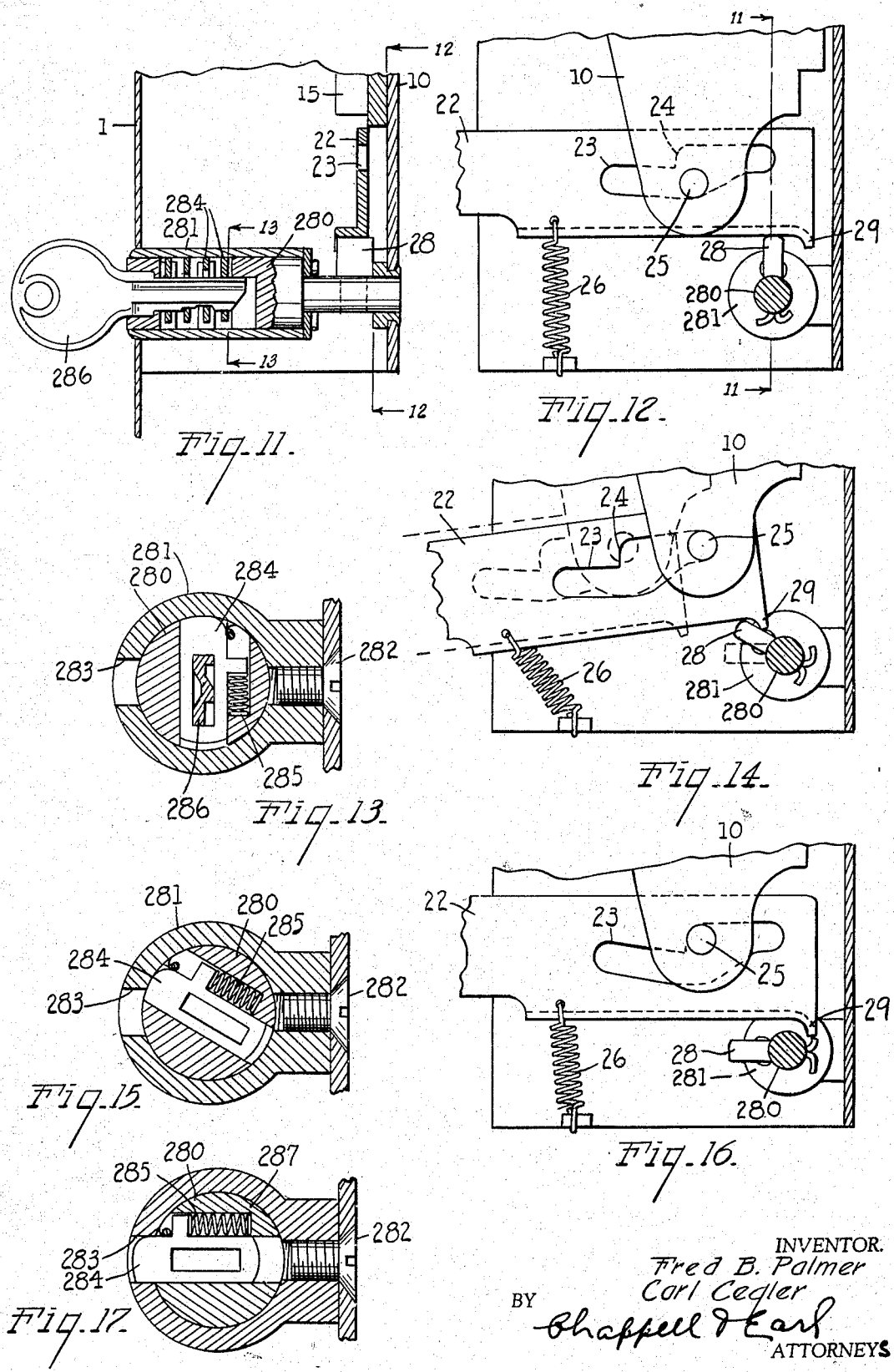

Patented Oct. 5, 1937

2,094,746

UNITED STATES PATENT OFFICE 2,094,746

AUTOMOBILE DOOR LATCH

Fred B. Palmer and Carl Cegler, Grand Rapids, Mich.

Application March 21, 1935, Serial No. 12,141

16 Claims. (Cl. 70—147)

The main objects of this invention are:

First, to provide an improved latching mechanism which is especially well adapted for use in automobile doors wherein the space for the mechanism is limited and it is desirable to prevent rattling.

Second, to provide an improved latching mechanism which is effective to prevent rattling even when the door is not completely closed.

Third, to provide improved locking means in a latching mechanism of the foregoing character.

Fourth, to provide an automobile door latch which is simple and economical in its parts, compact and very efficient and effective for the purpose intended.

Objects relating to details and economies of our invention will appear from the description to follow. The invention is defined and pointed out in the claims.

Preferred embodiments of our invention are illustrated in the accompanying drawings, in which:

Fig. 2 is a fragmentary view mainly in horizontal section on line 2—2 of Figs. 1 and 3.

Fig. 3 is a fragmentary view mainly in vertical section on line 3—3 of Figs. 1 and 2.

Fig. 6 is a fragmentary view mainly in horizontal section on line 6—6 of Figs. 1 and 3.

Fig. 7 is a similar view showing the door partially open.

Fig. 8 is a perspective view of the plate-like member of the latching mechanism.

Fig. 10 is a fragmentary view mainly in vertical section on line 10—10 of Fig. 9.

Fig. 11 is a fragmentary sectional view on the line 11—11 of Fig. 12, illustrating the construction of the cylinder lock and lug actuated thereby.

Fig. 12 is a fragmentary sectional view on line 12—12 of Fig. 11.

Fig. 13 is a fragmentary enlarged sectional view on the line 13—13 of Fig. 11.

Fig. 14 is a fragmentary view illustrating the manner of operation of our unlatching mechanism.

Fig. 15 is a fragmentary view similar to Fig. 13, illustrating the parts of the lock in partially unlocked position.

Fig. 16 is a view similar to Fig. 14, illustrating the mechanism in a different position.

Fig. 17 is a view similar to Figs. 13 and 15, illustrating the tumblers of the lock in locked position.

Figure 1:
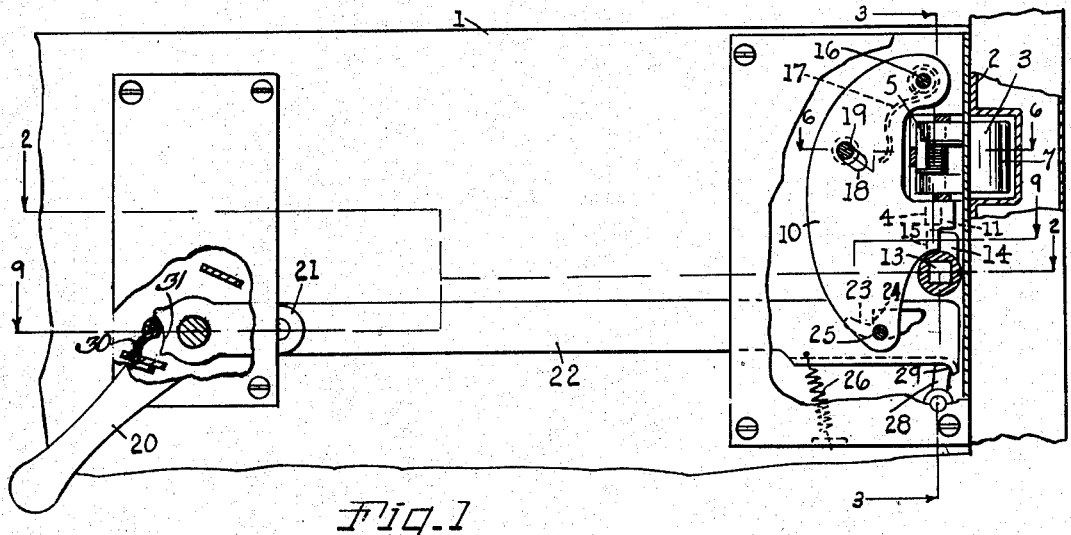
Fig. 1 is a fragmentary view in side elevation of an automobile door having a latching mechanism embodying features of our invention, the view being taken on line 1—1 of Figs. 2 and 3, portions of the construction being broken away and shown in vertical section.

In the embodiment of our invention illustrated by Figs. 1 to 8, inclusive, of the drawings, 1 in general is an automobile door having a jamb 2. The door is provided with a pivoted bolt or latch member 3 having a pin or projection 4 within the door, the latch member being urged to latching position by a coiled spring 5. The latch member 3 has a concave face 6 for coaction with the door frame or jamb 2 when the door is moved toward its closed position, the concave face reducing friction between the parts and facilitating the retraction of the latch member by the door jamb. The latch member is also provided with a cammed or rounded nose 7 for coaction with the latch receiving keeper or recess 9 in the door jamb to tighten the door and prevent rattling between the parts. This is very desirable in automobile body constructions which are subject to vibration.

To the inner panel of the door 1, we pivot a plate-like bolt actuating or retracting member 10 having a finger 11 engaging the front of the projection 4 of the latch member. This arrangement permits the latch member 3 to be retracted without interference with the actuating member when the door is moved to closed position. The retracting member 10, however, must be actuated in order to manually retract the latch member 3 to release the door for opening. For opening the door from the outside, a handle 12 is provided for rotation relative to the door, the spindle 13 of the handle having an arm 14 thereon adapted to engage a finger 15 on the actuating member. Thus, by turning the handle 12, the actuating member is actuated to retract the latch member 3.

The actuating member is pivoted to a stud 16, the latter constituting an anchor for the spring 17 which acts to urge the actuating member toward its initial position. For guiding and limiting the movement of the actuating member, we provide the latter with a slot 18 for coaction with a pin 19 fixed to the door.

For opening the door from the inside, we provide a handle 20 having an arm 21 connected to the inner end of an operating bar or link 22 arranged adjacent the inner panel of the door. At its outer end, the link 22 is provided with an arcuate slot 23 having a lateral transverse stop 24. This slot provides a path for the pin 25 fixed to the lower end of the actuating member 10 so that when the link 22 is in raised position the actuating member is free to swing in either direction. The outer end of the link is urged downwardly by a spring 26 to cause the pin 25 to be engaged by the stop 24 to lock the actuating member against latch retracting movement.

The key operated unlocking mechanism 27 has a lug 28 fixed to the rotary spindle 280 of a conventional cylinder lock, the casing 281 of which is secured by screws 282 to the door. Casing 281 is provided with a tumbler slot 283 to accommodate the tumblers 284 which are urged radially by springs 285 in the usual manner. The tumblers are of length less than the inner diameter of the casing to enable a key to be withdrawn after insertion to manipulate the tumblers in a manner to be hereinafter described. Lug 28 coacts with the outer end of the link 22 to hold the same in raised position against the action of the spring 26 with the slot 23 providing a path for the pin 25. For coaction with the lug 28, the outer end of the link has a lip 29 adapted to move the lug 28 to release the link when the latter is actuated.

Figure 4:
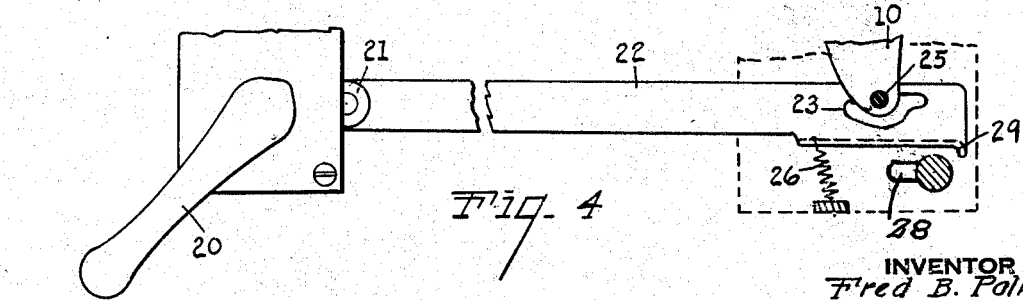
Fig. 4 is a fragmentary view partially in side elevation and partially in section of the parts in locked position.

To releasably hold the link 22 and arm 21 in alinement, the handle 20 is provided with a spring 30 coacting with a cam 31. Handle 20 is adapted to be actuated into a locked position as illustrated in Fig. 4, wherein link 22 is alined with arm 21, and spring 30 engages arm 31, the spring and cam acting as a detent to hold the arm and link in dead center alinement, see Fig. 1. In this dead center position of the parts 21 and 22, stop 24 abuts pin 25 to prohibit movement of actuating member 10 in a clockwise direction of rotation as viewed in Figs. 4 and 16. In such position of the parts, the door may be opened from the outside only by the insertion of key 286 in the lock plug 287. By means of the key, the tumblers 284 are retracted from slot 283 and the lock plug and lug 28 may be rotated from the position shown in Figs. 4, 16, and 17 to the position of Figs. 1, 11, and 12, at which time slot 23 permits movement of pin 25 under actuation from the outside.

Figure 5:
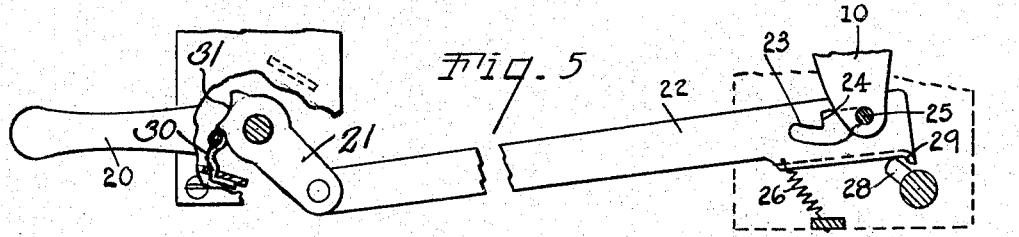
Fig. 5 is a similar view of the parts in unlocked position.

Lip 29 is operative to move lug 28 from upright position into the horizontal position each time the link 22 is actuated, assuming that the lug is in upright position at the time of actuation. This action is illustrated in Fig. 12 wherein link 22 is shown in solid lines during its movement under the influence of inner handle 20 and in dotted lines at the final position, at which position the door is unlatched and lug 28 is horizontal, tumblers 284 extending into slot 283. The door is, however, not locked against opening movement from the outside until handle 20 has been rotated in the opposite direction, or counterclockwise as viewed in Fig. 4, to bring link 22 and arm 21 into dead center alinement where further counterclockwise movement is prohibited by a suitable stop. As long as the link and arm are angularly disposed as shown in Fig. 5, the door may be opened from the outside, inasmuch as pin 25 engages stop 24 and moves link 22 to the left against the resistance of springs 26 and 30. Likewise, the door may be opened from the inside by turning handle 20 in clockwise direction, the right-hand end of slot 23 engaging pin 25 to pull actuating member 10 to the left.

To recapitulate: As long as arm 21 and link 22 are angularly disposed with respect to one another, the door may be opened by either the inner or the outer handle. With the arm and link in dead center alinement, the door may not be opened from the outside unless key 286 is utilized to rotate lug 28 into a vertical position, thus lifting link 22 and furnishing a path, i. e., slot 23, wherein pin 25 may travel. Key 286 is not employed to lock the door from the outside, inasmuch as that function is performed by the actuation of handle 20 in counterclockwise direction to bring arm 21 and link 22 into alinement.

Figure 9:
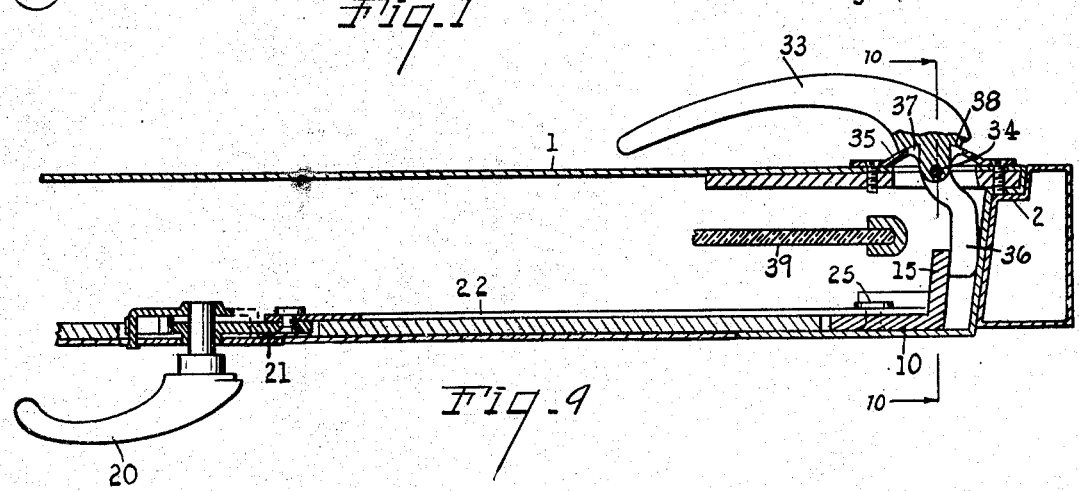
Fig. 9 is a view similar to Fig. 2, of a modification, the section being taken on line 9—9 of Fig. 10.

In the modification of our invention illustrated by Figs. 9 and 10, the handle 33 at the outside of the door is of the pull type, the handle being pivoted at 34 to an escutcheon 35 and having an arm 36 engageable with the pin 15 of the actuating member. The slot 37 in the escutcheon is closed at all times by the overlapping part 38 of the handle 33.

From the foregoing description of our invention, it will be apparent to those skilled in the art that we provide a maximum space for the vertically adjustable window pane 39 of the door. This is very desirable especially at the free edge of the door. With our construction, the space between the edge of the window pane and the edge of the door is reduced to a minimum. Our actuating member contributes in no small measure to this desirable result. Our improvements are not only compact, but are efficient and economical.

We have illustrated and described our improvements in embodiments which we find very practical. We have not attempted to illustrate or describe other embodiments or adaptations as it is believed this disclosure will enable those skilled in the art to embody or adapt our improvements as may be desired.

Although we have shown and described certain specific embodiments of our invention, we are fully aware that many modifications thereof are possible. Our invention is therefore not to be restricted except insofar as is necessitated by the prior art and by the spirit of the appended claims.

Having thus described our invention, what we claim as new and desire to secure by Letters Patent, is:

1. In an automobile door latching mechanism, the combination with a pivoted latch member resiliently urged to latching position and having a projection within the door, of a plate-like actuating member pivoted to the inner panel of the door above said latch member and having a finger engaging the front of said projection, an outer door handle having means engageable with said actuating member to retract said latch member, an inner door handle having an arm adjacent the inner door panel, a link pivoted at its inner end to said arm and having an arcuate slot near its outer end provided with a lateral transverse stop, the actuating member having a pin coacting with said slot, spring means urging said link to engage said stop with said pin to lock said actuating member against latch retracting movement, a key operated unlocking mechanism having a lug coacting with the outer end of said link to hold the same with said slot providing a path for said pin, the outer end of said link having a lip engaging said lug to move the same to release the link when the latter is operated, and means associated with the inner door handle for releasably keeping said arm and link in line.

2. In an automobile door latching mechanism, the combination with a pivoted latch member resiliently urged to latching position and having a projection within the door, of a plate-like actuating member pivoted to the inner panel of the door above said latch member and having a finger engaging the front of said projection, an outer door handle having means engageable with said actuating member to retract said latch member, an inner door handle link having an arcuate slot near its outer end provided with a lateral transverse stop, the actuating member having a pin coacting with said slot, spring means urging said link to engage said stop with said pin to lock said actuating member against latch retracting movement, and an unlocking mechanism having a lug coacting with the outer end of said link to hold the same with said slot providing a path for said pin, the outer end of said link having a lip engaging said lug to move the same to release the link when the latter is operated.

3. In an automobile door latching mechanism, the combination with a pivoted latch member resiliently urged to latching position, of a plate-like actuating member pivoted to the inner panel of the door above said latch member and having a means engaging the latch member, an outer door handle having means engageable with said actuating member to retract said latch member, an inner door handle having an arm adjacent the inner door panel, a link pivoted at its inner end to said arm and having an arcuate slot near its outer end provided with a lateral transverse stop, the actuating member having a pin coacting with said slot, spring means urging said link to engage said stop with said pin to lock said actuating member against latch retracting movement, an unlocking mechanism having means coacting with the outer end of said link to hold the same with said slot providing a path for said pin, the outer end of said link having means engaging said last named means to move the same to release the link when the latter is operated, and means associated with the inner door handle for releasably keeping said link in line with the center of the inner door handle.

4. In an automobile door latching mechanism, the combination with a pivoted latch member resiliently urged to latching position, of a plate-like actuating member pivoted to the door and having a means engaging the latch member, an outer door handle having means engageable with said actuating member to retract said latch member, an inner door handle link having an arcuate slot near its outer end provided with a lateral transverse stop, the actuating member having a pin coacting with said slot, spring means urging said link to engage said stop with said pin to lock said actuating member against latch retracting movement, an unlocking mechanism having means coacting with the outer end of said link to hold the same with said slot providing a path for said pin, and means for releasably keeping said link in line with the center of the inner door handle.

5. In an automobile door latching mechanism, the combination with a pivoted latch member resiliently urged to latching position, of an actuating member pivoted to the door and having means adapted to retract said latch member, an outer door handle having means engageable with said actuating member to retract said latch member, an inner door handle having an arm, a link pivoted at its inner end to said arm, the actuating member and outer end of said link having a pin and slot connection, the slot having a transverse stop, spring means urging said link to engage said stop with said pin to lock said actuating member against latch retracting movement, a key operated unlocking mechanism coacting with the outer end of said link to move the same to a position with the slot providing a path for the pin, and said link having means coacting with said unlocking mechanism to move the same to release the link when the latter is operated, and means associated with the inner door handle for releasably keeping said arm and link in line.

6. In an automobile door latching mechanism, the combination with a pivoted latch member resiliently urged to latching position, of an actuating member pivoted to the door and having means adapted to retract said latch member, an outer door handle having means engageable with said actuating member to retract said latch member, an inner door handle having an arm, a link pivoted at its inner end to said arm, the actuating member and outer end of said link having a pin and slot connection, the slot having a transverse stop, means urging said link to engage said stop with said pin to lock said actuating member against latch retracting movement, an unlocking mechanism coacting with the outer end of said link to move the same to a position with the slot providing a path for the pin, and said link having means coacting with said unlocking mechanism to move the same to release the link when the latter is operated.

7. In a door latching mechanism, the combination of a latch member, an actuating member having means adapted to retract said latch member from latching position, a door handle having an arm, a link pivoted at its inner end to said arm, the actuating member and outer end of said link having a pin and slot connection, the slot having a transverse stop, means urging said link to engage said stop with said pin to lock said actuating member against latch retracting movement, and unlocking means coacting with the outer end of said link to move the same to a position with the slot providing a path for the pin, said link having means coacting with said unlocking means to move the same to release the link when the latter is operated.

8. In a door latching mechanism, the combination of a latch member, means adapted to retract said latch member from latching position, a door handle having an arm, a link pivoted at its inner end to said arm, said retracting means and outer end of said link having a pin and slot connection, the slot having a transverse stop, means urging said link to engage said stop with said pin to lock said retracting means against latch retracting movement, and unlocking means coacting with the outer end of said link to move the same to a position with the slot providing a path for the pin, said link having means coacting with said unlocking means to move the same to release the link when the latter is operated.

9. In a door latching mechanism, the combination of a latch member, means adapted to retract said latch member from latching position, a door handle having an arm, a link pivoted at its inner end to said arm, said retracting means and outer end of said link having a pin and slot connection, the slot having a transverse stop, means urging said link to engage said stop with said pin to lock said retracting means against latch retracting movement, unlocking means coacting with the outer end of said link to move the same to a position with the slot providing a path for the pin, and means coacting with said unlocking means to move the same to release the link when the latter is operated.

10. In a door latching mechanism, the combination of a latch member, means adapted to retract said latch member from latching position, a door handle having an arm, a link pivoted at its inner end to said arm, said retracting means and outer end of said link having a pin and slot connection, the slot having a transverse stop, means urging said link to engage said stop with said pin to lock said retracting means against latch retracting movement, and unlocking means coacting with the outer end of said link to move the same to a position with the slot providing a path for the pin.

11. In a door latching mechanism, the combination of a latch member, an actuating member having means adapted to retract said latch member from latching position, a door handle having an arm, a link pivoted at its inner end to said arm, the actuating member and outer end of said link having a limited sliding connection, means urging said link to obstruct said actuating member against latch retracting movement, and unlocking means coacting with the outer end of said link to move the same to unobstructing position, said link having means coacting with said unlocking means to move the same to release the link when the latter is operated.

12. In a door latching mechanism, the combination of a latch member, means adapted to retract said latch member from latching position, a door handle having an arm, a link pivoted at its inner end to said arm, said retracting means and outer end of said link having a limited sliding connection, means urging said link to obstruct said retracting means against latch retracting movement, and unlocking means coacting with the outer end of said link to move the same to unobstructing position, said link having means coacting with said unlocking means to move the same to release the link when the latter is operated.

13. In a door latching mechanism, a latch member, retracting means for said member, means for actuating said retracting means, comprising a link having a slot disposed for limited sliding engagement with said retracting means, said actuating means engaging said retracting means in locking position of the actuating means, means for shifting said actuating means into locking position to prevent retracting movement of said retracting means and comprising a manually operated arm pivotally connected to said link, and key operated means to restore said actuating means from said locking position to unlocking position.

14. In a door latching mechanism, a latch member, retracting means for said member, means for actuating said retracting means disposed for limited sliding engagement with said retracting means, said actuating means engaging said retracting means in locking position of the actuating means, means for shifting said actuating means into locking position to prevent retracting movement of said retracting means, and key operated means to restore said actuating means from said locking position to unlocking position.

15. In a door latching mechanism, a latch member, retracting means for said member, means for actuating said retracting means disposed for limited sliding engagement with said retracting means, said actuating means engaging said retracting means in locking position of the actuating means, means for shifting said actuating means into locking position to prevent retracting movement of said retracting means, and means to restore said actuating means from said locking position to unlocking position.

16. In a door latching mechanism, a latch member, retracting means for said member, means for actuating said retracting means, comprising a link having a slot disposed for limited sliding engagement with said retracting means, said actuating means engaging said retracting means in locking position of the actuating means, and means for shifting said actuating means into locking position to prevent retracting movement of said retracting means, comprising a manually operated arm pivotally connected to said link.

FRED B. PALMER.
CARL CEGLER.